(12) United States Patent
Haga

(10) Patent No.: US 7,246,426 B2
(45) Date of Patent: Jul. 24, 2007

(54) METHOD FOR MANUFACTURING A MOTOR

(75) Inventor: Shigeyuki Haga, Toyohashi (JP)

(73) Assignee: DENSO Corporation (JP)

( * ) Notice: Subject to any disclaimer, the term of this patent is extended or adjusted under 35 U.S.C. 154(b) by 304 days.

(21) Appl. No.: 10/901,059

(22) Filed: Jul. 29, 2004

(65) Prior Publication Data

US 2005/0001506 A1    Jan. 6, 2005

Related U.S. Application Data

(62) Division of application No. 10/638,298, filed on Aug. 12, 2003, now Pat. No. 6,787,966.

(30) Foreign Application Priority Data

Sep. 6, 2002  (JP)  .............................. 2002-261846

(51) Int. Cl.
  *H02K 15/02*  (2006.01)
  *H02K 15/10*  (2006.01)
(52) U.S. Cl. ............................ 29/598; 29/596; 29/605; 29/606; 29/609; 310/216; 310/217; 310/218
(58) Field of Classification Search .................. 29/598, 29/596, 605, 606, 609; 310/216, 217, 218
See application file for complete search history.

(56) References Cited

U.S. PATENT DOCUMENTS

| | | | |
|---|---|---|---|
| 596,152 A | 12/1897 | Geisenhoner | |
| 671,235 A | 4/1901 | Reist | |
| 1,369,765 A | 3/1921 | Alexander | |
| 2,308,028 A | 1/1943 | Bennie | |
| 2,449,506 A | 9/1948 | Pollard | |
| 3,215,875 A | 11/1965 | Latta | |
| 3,612,930 A | 10/1971 | Raby | |

(Continued)

FOREIGN PATENT DOCUMENTS

JP    11-018337    1/1999

OTHER PUBLICATIONS

Japanese Office Action issued on Sep. 19, 2006 in corresponding Japanese Patent Application No. 2002-261846 with English translation.

*Primary Examiner*—A. Dexter Tugbang
*Assistant Examiner*—Tim Phan
(74) *Attorney, Agent, or Firm*—Nixon & Vanderhye PC

(57) ABSTRACT

A method of manufacturing a motor that includes a permanent magnet unit disposed at a circumference for providing a plurality of magnetic poles, and a rotor disposed inside the circumference to be coaxial with the said permanent magnet unit. The rotor includes a center core coaxial with the center axis of the rotor, a plurality of coil cores disposed at peripheral portions of the rotors, and a plurality of concentrated coils respectively mounted on the coil cores. The method includes simultaneously: holding all of the coil cores by peripheral portions thereof so that outer peripheries of the held coil cores are on a prescribed circle, punching corners of one end of the center core to form chamfered corners; and moving the held coil cores from the end of the center core where the chamfered corners are formed so that the center core can be completely fitted to the held coil cores.

5 Claims, 10 Drawing Sheets

U.S. PATENT DOCUMENTS

| | | |
|---|---|---|
| 4,246,505 A | 1/1981 | Yasaka |
| 4,464,826 A | 8/1984 | Bair |
| 4,467,231 A | 8/1984 | Biglino |
| 4,835,839 A | 6/1989 | Forbes et al. |
| 4,951,377 A | 8/1990 | Fritzsche |
| 5,918,360 A | 7/1999 | Forbes |
| 6,219,900 B1 | 4/2001 | Suzuki |
| 6,806,615 B2 * | 10/2004 | Enomoto et al. ........... 310/218 |
| 6,880,229 B2 * | 4/2005 | Zepp et al. ................ 29/596 |

* cited by examiner

METHOD FOR MANUFACTURING A MOTOR

CROSS REFERENCE TO RELATED APPLICATION

This application is a division of application Ser. No. 10/638,298, filed Aug. 12, 2003, now U.S. Pat. No. 6,787,966, the entire contents of which is hereby incorporated by reference in this application.

The present application is based on and claims priority from Japanese Patent Application 2002-261846, filed Sep. 6, 2002, the contents of which are incorporated herein by reference.

BACKGROUND OF THE INVENTION

1. Field of the Invention

The present invention relates to an electric motor and a method and an apparatus for manufacturing such a motor.

2. Description of the Related Art

Usually, a motor has a stator that includes a plurality of permanent magnets circumferentially disposed on the inside surface thereof to provide magnetic poles and a rotor that is disposed in the space surrounded by the magnetic poles. For example, JP-A-10-145990 discloses a motor in which the rotor is constituted of a center core, a plurality of coil cores on which concentrated coils or solenoid coils are mounted. The center core is disposed to be coaxial with the rotating axis of the rotor, and the coil cores are disposed around the center core. Each of the concentrated coils is wound around an insulator. Thus, a high space factor, which is a ratio of the conductor's volume to the motor's total volume, can be provided.

In the disclosed motor, the center core and the coil cores are fixed by means of concavity-convexity connection. In other words, projections are formed in one of the center core and the coil cores, and recesses are formed in the other so that the projections can be fitted into the recesses in the radial direction when they are assembled.

However, it is difficult to insert a plurality of projections into the recesses at one time, and each coil core has to be fixed to the center core.

SUMMARY OF THE INVENTION

A main object of the invention is to provide an improved rotor of a motor that is easy to be assembled.

According to a main feature of the invention, a motor includes a permanent magnet unit disposed at a circumference for providing a plurality of magnetic poles, a rotor disposed inside the circumference to be coaxial with the permanent magnet unit. The rotor is constituted of a center core disposed to be coaxial with a center axis of the rotor, a plurality of coil cores disposed at peripheral portions of the rotor and a plurality of concentrated coils respectively mounted on the coil cores. In assembling, each coil core is fitted to the center core by sliding in an axial direction of the center core.

In the above featured motor, one of the center core and the plurality of coil cores has axially extending engagement grooves at peripheral portions thereof, and the other has axially extending engagement projections at peripheral portions thereof. The engagement projections project toward the engagement grooves to be fitted to the engagement grooves when the engagement projections move or slide in the axial direction. Preferably, the engagement groove has a generally trapezoidal cross-section having a smaller parallel side being open at the peripheral portion, and the engagement projection has a generally trapezoidal cross-section that is complementary to the trapezoidal cross-section of the engagement groove.

In the above featured motor, an axial end of the engagement groove or an axial end of the engagement projection is chamfered.

Another object of the invention is to provide a method of manufacturing such an improved motor.

Another main feature of the invention, a method of manufacturing the above featured motor includes a step of holding a plurality of coil cores disposed in the same position as the rotor so that the periphery thereof can be on a prescribed circle, and a step of moving the center core in the axial direction thereof to insert the same into the inside surfaces of the coil cores.

In the above featured method of manufacturing, the step of moving further includes a step of restricting the coil cores to move in radially outward directions. Preferably, the step of restricting includes a step of pressing the coil cores in radially inward directions. The step of holding may include a step of restricting the coil cores to move in an axial direction of the prescribed circle, and the step of moving may include a step of pressing an axial end of the center core in the same axial direction to insert the center core into the coil cores.

Another object of the invention is to provide an apparatus for manufacturing such an improved motor.

According to another feature of the invention, an apparatus for manufacturing the above featured motor includes means for holding the plurality of coil cores disposed in the same position as the rotor so that the periphery thereof can be on a prescribed circle, and means for moving the center core in the axial direction thereof to insert the same into the inside surfaces of the coil cores. In the above featured apparatus, the means for of moving may include means for restricting the coil cores to move in radially outward directions. In the above featured apparatus, the step of restricting may include means for pressing the coil cores in radially inward directions. The means for holding may include means for restricting the coil cores to move in an axial direction of the prescribed circle, and the means for moving may include means for pressing an axial end of the center core in the same axial direction to insert the center core into the coil cores.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
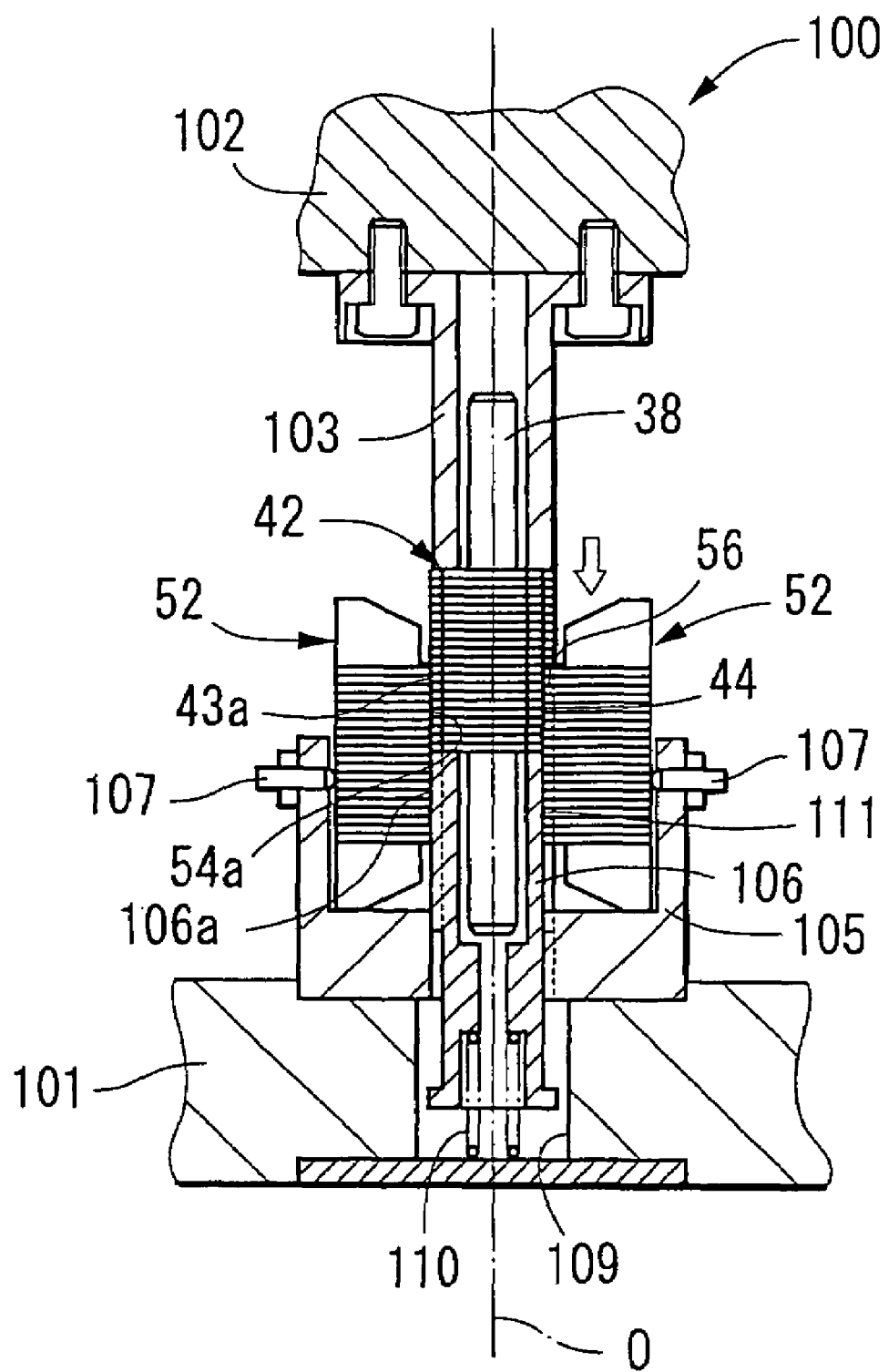
FIG. 1 is a schematic view of an apparatus for manufacturing a motor according to a preferred embodiment of the invention.
Figure 2:
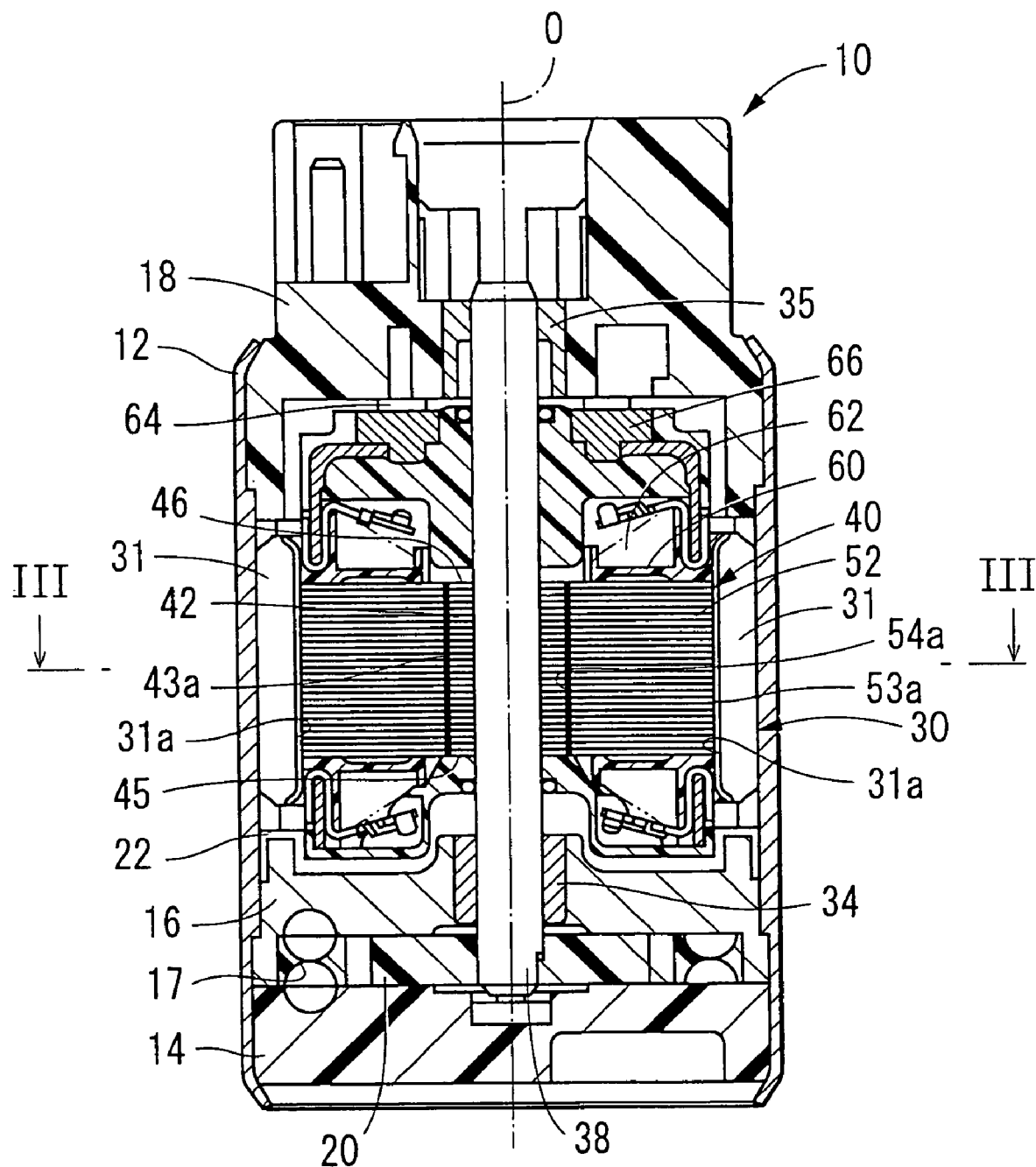
FIG. 2 is a cross-sectional side view of a fuel pump including the motor according to the preferred embodiment.
Figure 3A:
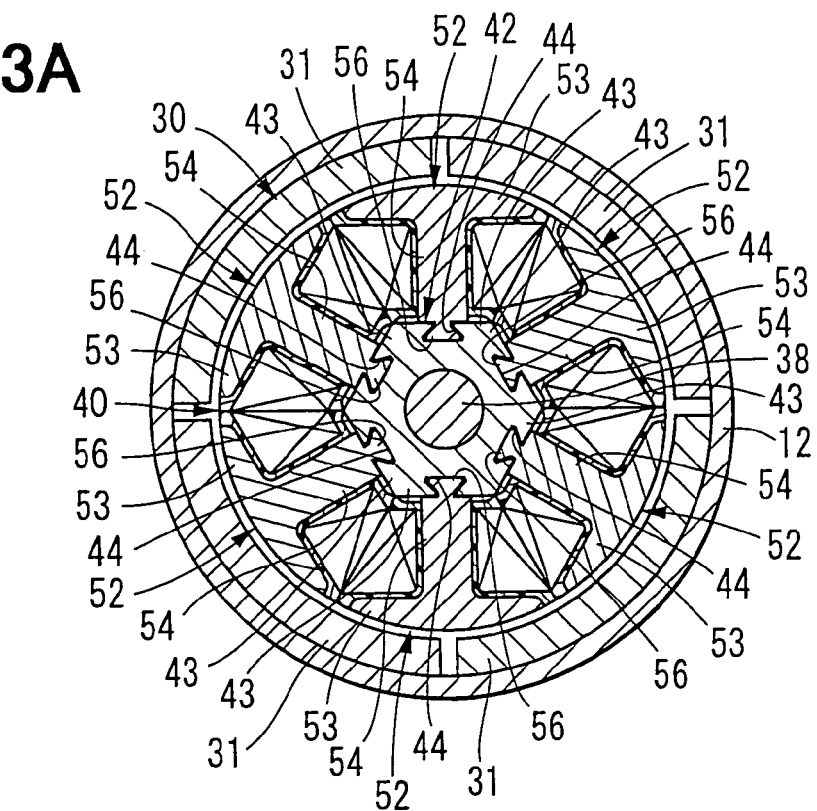
FIG. 3A is a cross-sectional view of the motor according to the preferred embodiment cut along line III—III in FIG. 2.
Figure 3B:
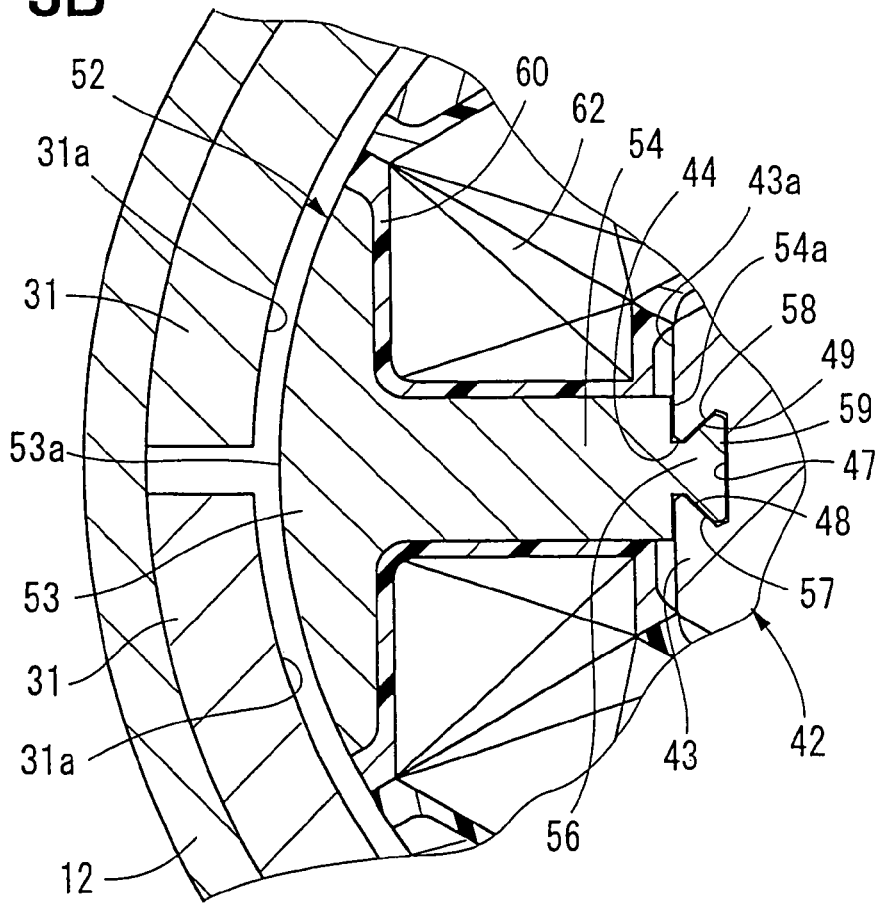
FIG. 3B is a fragmentary enlarged view of the motor shown in FIG. 3A.

A fuel pump that includes a motor according to a preferred embodiment of the invention will be described with reference to FIGS. 1–FIGS. 3A and 3B.

The fuel pump 10 is an in-tank type pump that is mounted in a fuel tank of a vehicle. The fuel pump 10 includes a housing 12, a fuel-inlet cover 14, a pump casing 16, a fuel-outlet cover 18, an impeller 20, a permanent magnet unit 30, a pair of bearings 34 and 35, a shaft 38 and a rotor 40. The covers 14 and 18 are respectively fixed to the opposite ends of the housing 12 by crimping. The pump casing 16 is disposed between the fuel-inlet cover 14 and the housing 12. A pump channel 17 is formed between the fuel-inlet cover 14 and the pump casing 16. The impeller 20 is rotatably held between the fuel-inlet cover 14 and the pump casing 16. The impeller 20 has a disk plate and a plurality of blade-and-ditches formed on the periphery of the disk plate. When the impeller 20 rotates together with the rotor 10, a pressure difference is generated between front and rear sides of blade-and-ditches. As the pressure difference is repeatedly generated by the plurality of blade-and-ditches, the fuel in the pump channel 17 is pressurized. When the impeller rotates, the fuel in the fuel tank is pumped into the pump channel 17 through a fuel inlet (not shown) of the fuel-inlet cover 14. Then the fuel passes through a motor chamber 22 and a fuel outlet to be discharged into an engine.

The permanent magnet unit 30 is constituted of four permanent magnets 31. Each permanent magnet 31 has an arc of about a quarter of a circumference of the inner surface of the housing so that four permanent magnets 31 can be mounted thereon. Each of the permanent magnets 31 has a smooth arc-shaped concave inner surface 31a, which forms one of magnetic poles. The inner surface 31a of one of the permanent magnets 31 provides a magnetic pole different from the inner surface 31a of another permanent magnet 31 adjacent thereto in the circumferential direction.

The bearings 34, 35 are respectively fixed to the pump casing 16 and the fuel-inlet cover 18. The shaft 38 is disposed at the center of the permanent magnet unit 30. The shaft 38 is supported by the bearings 34, 35 to rotate about an axis 0.

The rotor 40 is rotatably disposed inside the permanent magnet unit 40 around the shaft 38. The rotor 40 has a center core 42 at the center thereof and six coil cores 52 at the radially outer portion 43 of the center core 42. Incidentally, the axial direction of the rotor 40 will be referred to as the axial direction, and the circumferential direction of the rotor will be referred to as the circumferential direction, without notice.

Figure 4A:
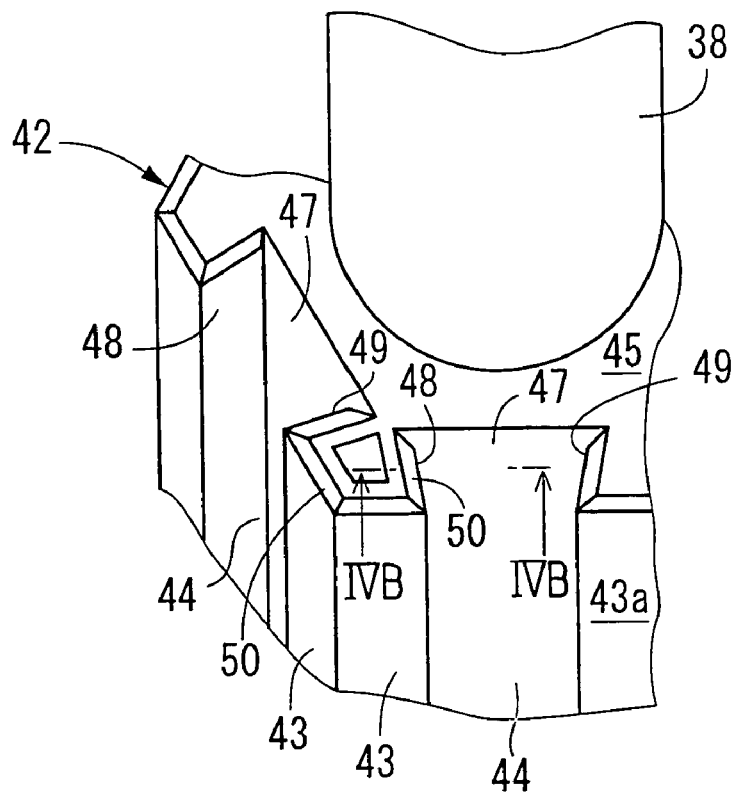
FIG. 4A is an enlarged perspective view of the center core shown in FIG. 2.
Figure 4B:
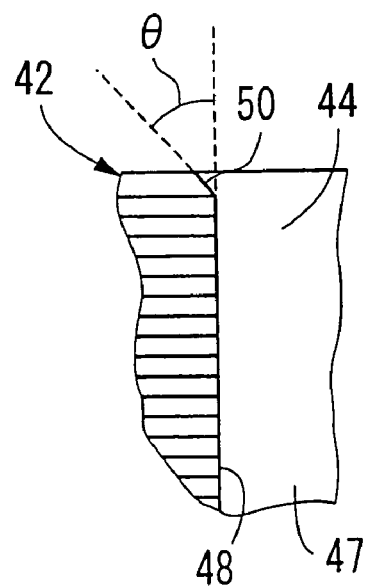
FIG. 4B is a cross-sectional side view of the center core cut along line IVB—IVB in FIG. 4A.

The center core 42 is a generally hexagonal column having six side surfaces 43a and has open engagement grooves 44 on the respective side surfaces 43a, which face respective coil cores 52. Each groove 44 extends from one core end 45 to the other core end 46 in the axial direction so that it opens at opposite ends of the center core 42. Each of the engagement grooves 44 has a bottom 47 and a pair of side walls 48 and 49. The distance between the side walls 48 and 49 becomes shorter as the pair of walls 48 and 49 comes closer to the opening or the side surface 43a. That is, the cross-section of the engagement grooves 44 is a trapezoid that has a smaller parallel side located at the opening of the groove 44. As shown in FIGS. 4A and 4B, all the corners 50 of the side surfaces 43a and the core ends 45, 46 except for the bottoms 47 of the grooves 44 are chamfered. The chamfered corners 50 have inclined surface of about 45 degrees in angle to the side surfaces 43a and the core ends 45, 46.

The six coil cores 52 are respectively covered by bobbins 60 with solenoid coils and fixed to the radially outer portions 43 of the center core 42. Each of the coil cores 52 is a T-shape member having a semi-lunar peripheral portion 53 and a spoke-like coil portion 54. The peripheral portion 53 has a smooth convex arc-shaped surface that forms a uniform air gap between the inner surface 31a of the permanent magnet 31. The coil portion 54 has a trapezoidal engagement projection 56 that projects radially inward from the radially inner surface 54a, which faces the center core 42. The engagement projection 56 extends from end to end of the coil portion 54 in the axial direction and fitted into each of the engagement grooves 44. The engagement projection 56 has a pair of side walls 57 and 58, and the distance between the side walls becomes longer as the pair of walls 57 and 58 extends more radially inward. That is, the cross-section of the engagement projection 56 is a trapezoid that is complementary with the cross section of the engagement groove 44. Therefore, the pair of side walls 57 and 58 of the engagement projection 56 is sandwiched and supported by the pair of side walls 48 and 49 of the engagement groove 44. As a result, the coil cores 52 are prevented from dropping out from the center core 42.

The bobbin 60 is made of a resin and covers the coil core 52 except the peripheral surface 53a of the peripheral portion 53 and the projection 56. The bobbin 60 magnetically insulates the peripheral portions of adjacent coil cores 52 from each other. The bobbin 60 sandwiches the coil portion 54 at the cross-section perpendicular to the axis 0 and provides a trapezoidal coil space which narrows from the peripheral portion 53 toward the center core 42. A solenoid coil 62 of magnet wire is accommodated in the coil space of each bobbin 60. Electric current is supplied to the coil 62 from a terminal via brushes 64 and commutator 66. The permanent magnet unit 30, the shaft 38, the rotor 40, etc. constitute an electric motor.

The rotor of such a motor is manufactured in the following steps.

Figure 5A:
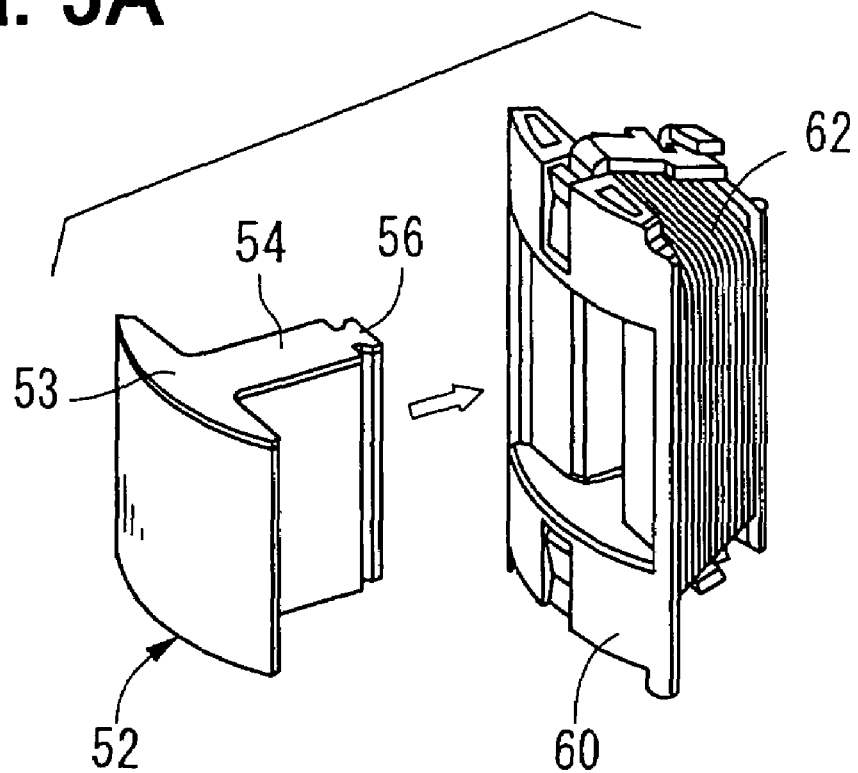
FIG. 5A and FIG. 5B illustrate steps of assembling a coil core and a solenoid coil of the rotor according to the preferred embodiment.
Figure 5B:
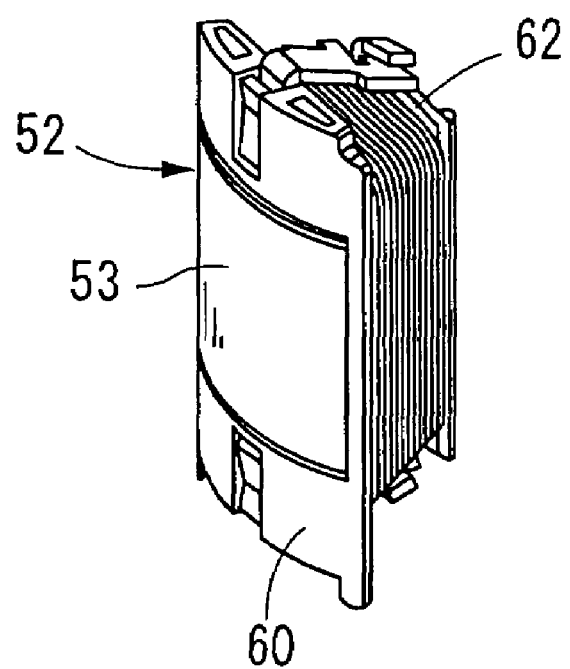

(1) After magnet wires are wound around the bobbins 60 to form the coils 62, the coil cores 52 are respectively inserted to the bobbins 60 from the coil portions 54, as shown in FIG. 5.

Figure 6A:
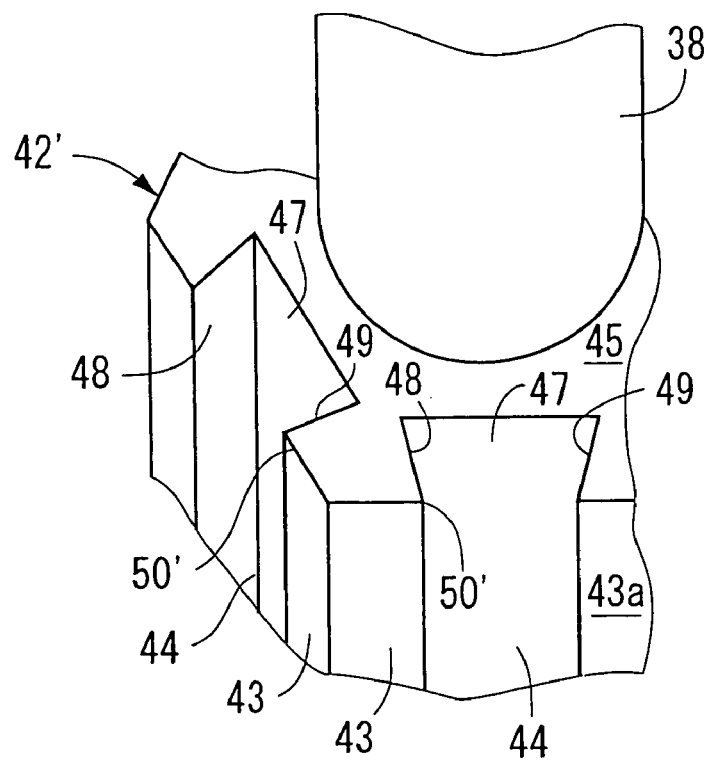
FIG. 6A and FIG. 6B illustrate steps of chamfering the center core.
Figure 6B:
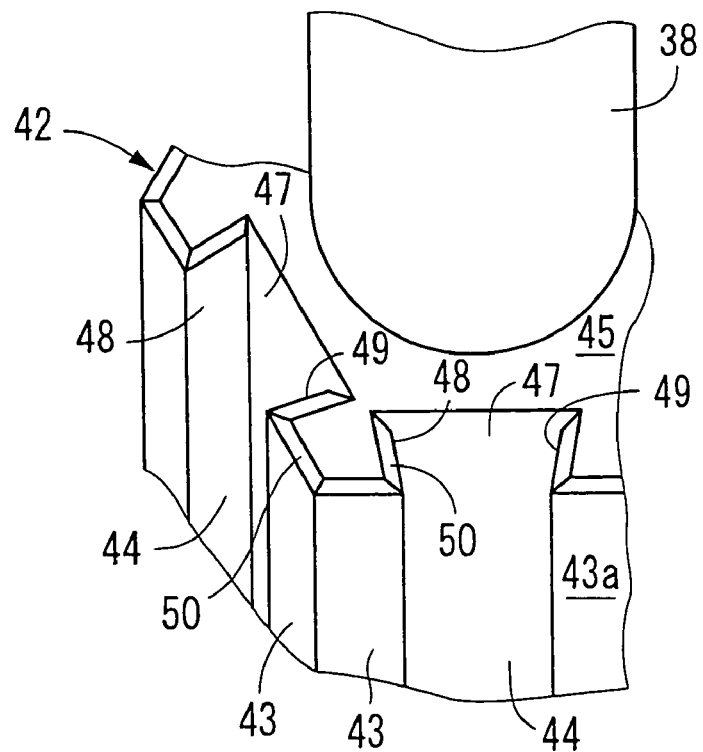
Figure 7A:
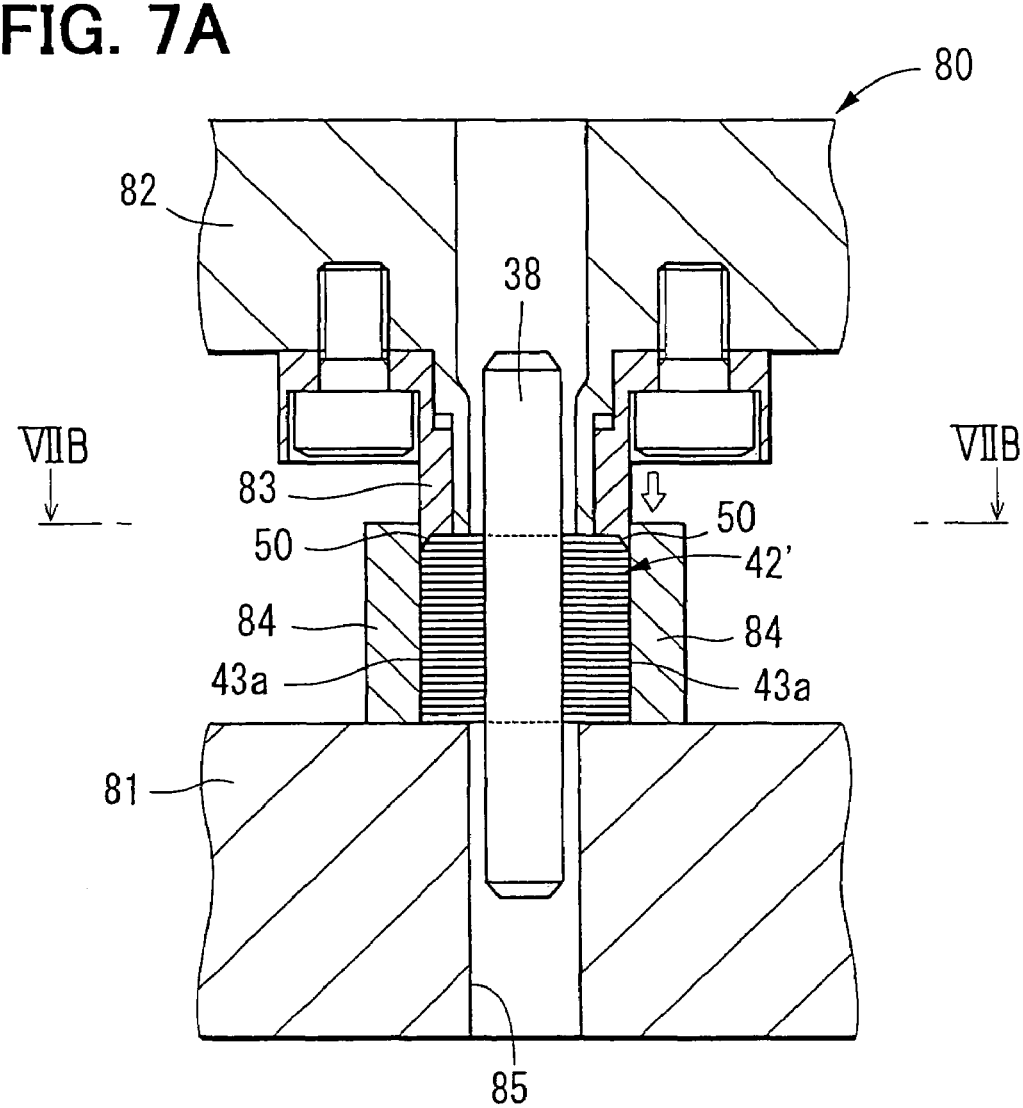
FIG. 7A is a schematic diagram illustrating an apparatus for chamfering the center core.

(2) As shown in FIGS. 6A and 6B, unprocessed piece 42' of the hexagonal-column-shape center core 42 is provided, and all the corners 50 of the side surfaces 43a and the core ends 45, 46 except for the bottoms 47 of the grooves 44 are chamfered by a chamfering apparatus 80 shown in FIG. 7A.

Figure 7B:
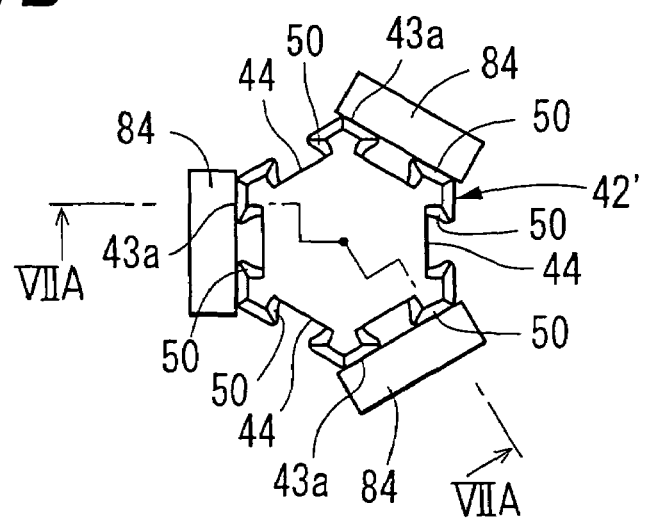
FIG. 7B is a cross-sectional view cut along line IIVB—IIVB in FIG. 7A.

The chamfering apparatus 80 is constituted of a base 81, a moving head 81, a punch 83, three holders 84, etc. The piece 42' is positioned on the base 81 so that the axis thereof can extends in the vertical direction. The shaft 38 is force-fitted to the center of the piece 42' to project downward from the lower end of the piece 42' into a hole 85 of the base 81. The moving head 82 is disposed above the base 81 to move in the vertical direction. The punch 83 has a hexagonal cross-section and is fixed to the moving head 82 to project toward the base 81. When the punch 83 moves toward the base 81, the upper end of the shaft 38 that projects from the upper end of the piece 42' enters the inside of the punch 83. The three holders 84 are disposed on the upper surface of the base at equal intervals in the circumferential direction so that each holder 84 can contact one of the side surfaces 43a of the piece 42', as shown in FIG. 7B. Therefore, the three holders 84 jointly restrict the piece 42' to move in the radial, circumferential and axially downward directions.

As shown in FIG. 7B, the peripheral portions 43 of the piece 42' is held by the three holders 84. Then, the moving head 82 is driven to move downward toward the base 81 to hit the punch 83 on the piece 42'. As a result, corners 50 of the outer portions 43 of the piece 42' are chamfered except for the grooves 44, as shown in FIGS. 6B and 7B.

Figure 8A:
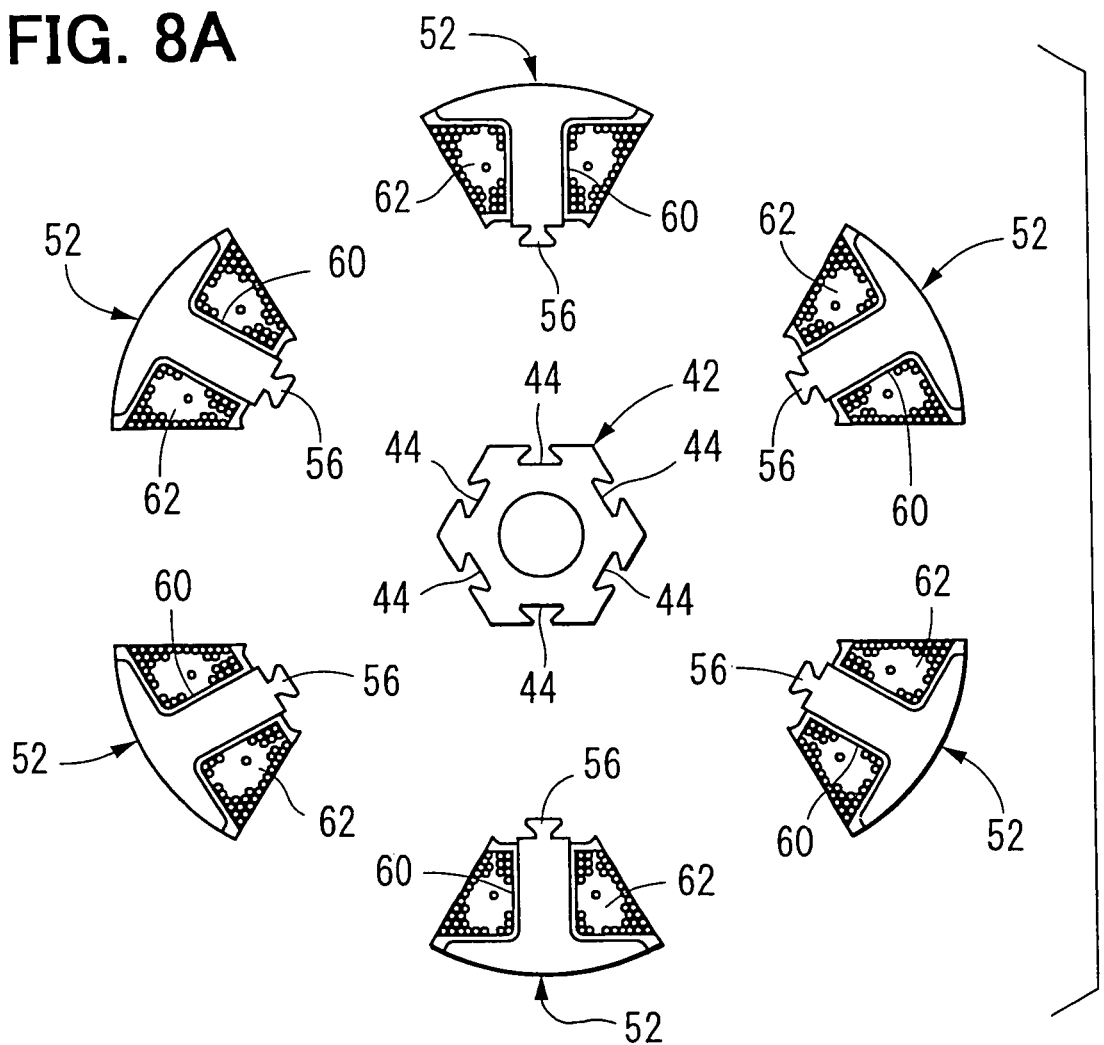
FIG. 8A and FIG. 8B illustrate steps of assembling the center core and the coil cores into the rotor.
Figure 8B:
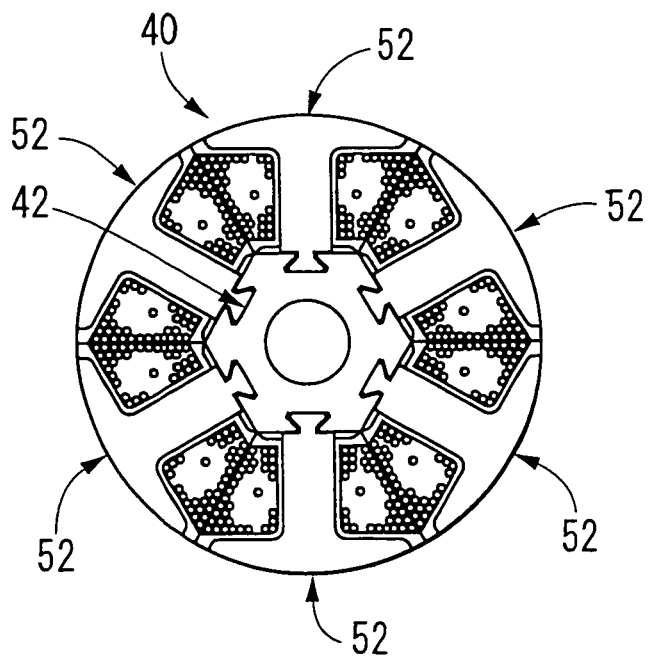
Figure 9A:
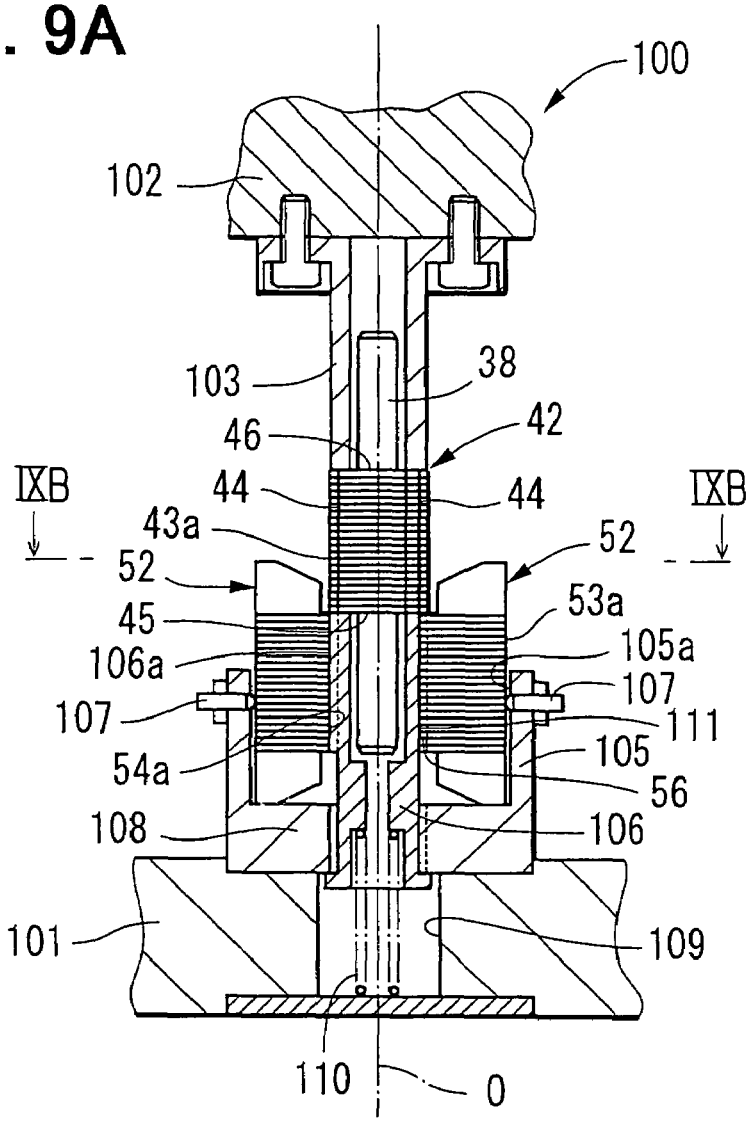
FIG. 9A is a cross-sectional view of an apparatus for assembling the center core and the coil cores into the rotor cut along line IXA—IXA in FIG. 9B.
Figure 9B:
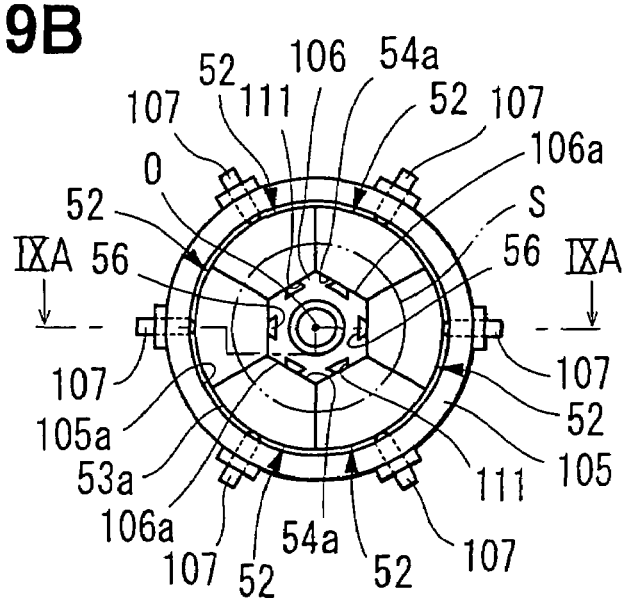
FIG. 9B is a cross-sectional view of the apparatus cut along line IXB—IXB.

(3) As shown in FIGS. 8A and 8B, the six coil cores 52 together with the bobbins 60 and the coils 62 (hereinafter referred to as the coil cores 52) are fixed to the peripheral portions 43 of the center core 42 at one time by an assembling apparatus 100, which is shown in FIGS. 9A and 9B.

The assembling apparatus 100 includes a base 101, a moving head 102, a punch 103, a cylindrical holder member 105, a support pin 106, a plurality of plungers 107, etc.

The holder member 105 has a cylindrical wall and a bottom 108 and is vertically fixed to the base 101 to support the six coil cores 52 from outside. The coil cores 52 are disposed in the holder member 105 so that they can have a common imaginary circle S that is coaxial with the holder member 105 and so that the peripheral surfaces 53a can be disposed opposite the inner surface of the holder member 105 at a small uniform clearance. The lower end surfaces of the coil cores 52 are in contact with the bottom 108 of the holder member 105, so that the coil cores 52 are restricted to move in the center axis of the imaginary line. Incidentally, the axis O is the center axis of the imaginary circle S, as shown in FIGS. 1 and 9.

The support pin 106 is a tube member having a hexagonal cross-section. In other words, the support pin 106 has six side surfaces 106a each of which has an engagement groove III that has the same cross-sectional shape as the engagement groove 44 of the center core 42. The support pin 106 is inserted in a bore 109 of the base 101 to move up and down and vertically penetrates the bottom 108 of the holder member 105. The lower end of the support pin 106 is biased upward by a coil spring 110, which is fixed to the base 101. When the support pin 106 projects into the inside of the holder member 105, the coil cores 52 are supported from inside. Then, the inner surface 54a of each coil core 52 contacts one of the six side surfaces 106a of the support pin 106, and the engagement projections 56 of the coil cores 52 are respectively fitted to the engagement grooves 111. Thus, the coil cores 52 are fixed in the circumferential and radial directions of the imaginary circle S.

Figure 10:
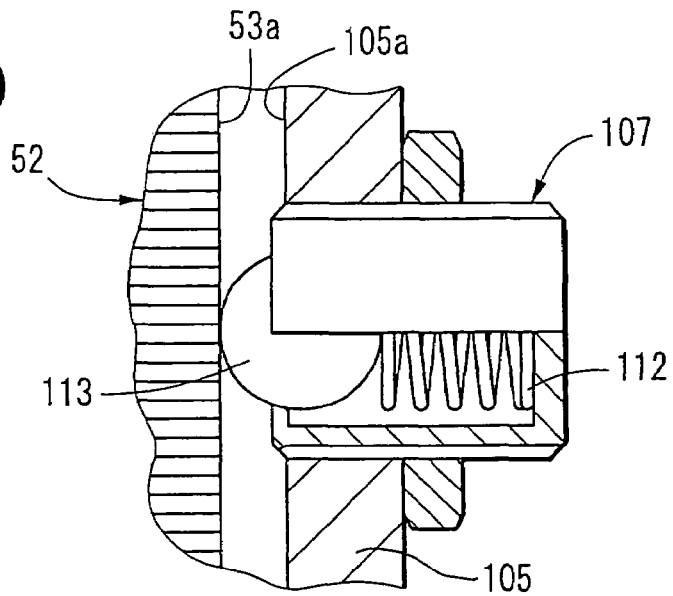
FIG. 10 is a schematic diagram illustrating a cross-section of a plunger of the apparatus for assembling.

Six plungers 107 are disposed on the circumference of the holder member 105 at equal intervals. Each plunger 107 presses one of the coil cores 52 from outside. As shown in FIG. 10, the plunger 107 is a ball type plunger that is constituted of a coil spring 112 and a ball 113. The plunger 107 biases the peripheral surface 53a of the coil cores 52 from outside by the ball 113, which is biased by the spring 112. Therefore, the coil cores 52 are restricted to move in the radially outward directions.

The moving head 102 is disposed above the base 101 to move up and down. The punch 103 is a cylindrical member that has an outside diameter smaller than the circumscribed circle of the hexagonal inner surface of the center core 42 and larger than the outside diameter of the shaft 38. The punch 103 is mounted on the moving head 102 to project along the same axis as the imaginary circle S. The punch 103 can go into the inside space of the coil cores 52 when it moves toward the base 101.

In assembling the coil cores 52 to the center core 42, six coil cores 52 are put between the holder member 105 and the support pin 106, which projects into the inside of the holder member, so that all the coil cores 52 are held on the imaginary circle S. Accordingly, the plungers 107 bias the outer peripheries of the respective coil cores 52 from outside to hold the coil cores 52 in a prescribed position of a rotor, as shown in FIG. 9B.

Then, the center core 42 is mounted on the upper surface of the coil cores 52, as shown in FIG. 9A. The center core 42 is set to align with the center axis O of the imaginary circle S with the core end 45 thereof being down so that the lower end of the shaft 38 can be inserted in the inside of the support pin 106. Further, the circumferential position of center core 42 is adjusted so that the engagement grooves 44 can confront the engagement projections 56 of the coil cores.

As shown in FIG. 1, the moving head 102 is moved down toward the base 101 so that the punch 103 presses the center core 42 downward. Accordingly, as the center core 42 moves downward relative to the coil cores 52, the engagement projections 56 are guided by the chamfered corners 50 and inserted into the engagement grooves 44. The support pin 106 is pushed by the lower core end 45 of the, center core 42 and moves down against the biasing force of the spring 110 until the center core 42 is completely force-fitted into the inside space of the six coil cores 52 to form a rotor 40.

In the above described step, it is possible to move the coil cores 52 relative to the center core 42. The chamfered corners 50 may be replaced by rounded corners or may be formed on the engagement projections 56 instead of the engagement grooves 44. The engagement projections 56 may be formed on the center core 42 instead of the engagement grooves 44, which have to be formed on the coil cores 52 in that case.

Figure 11:
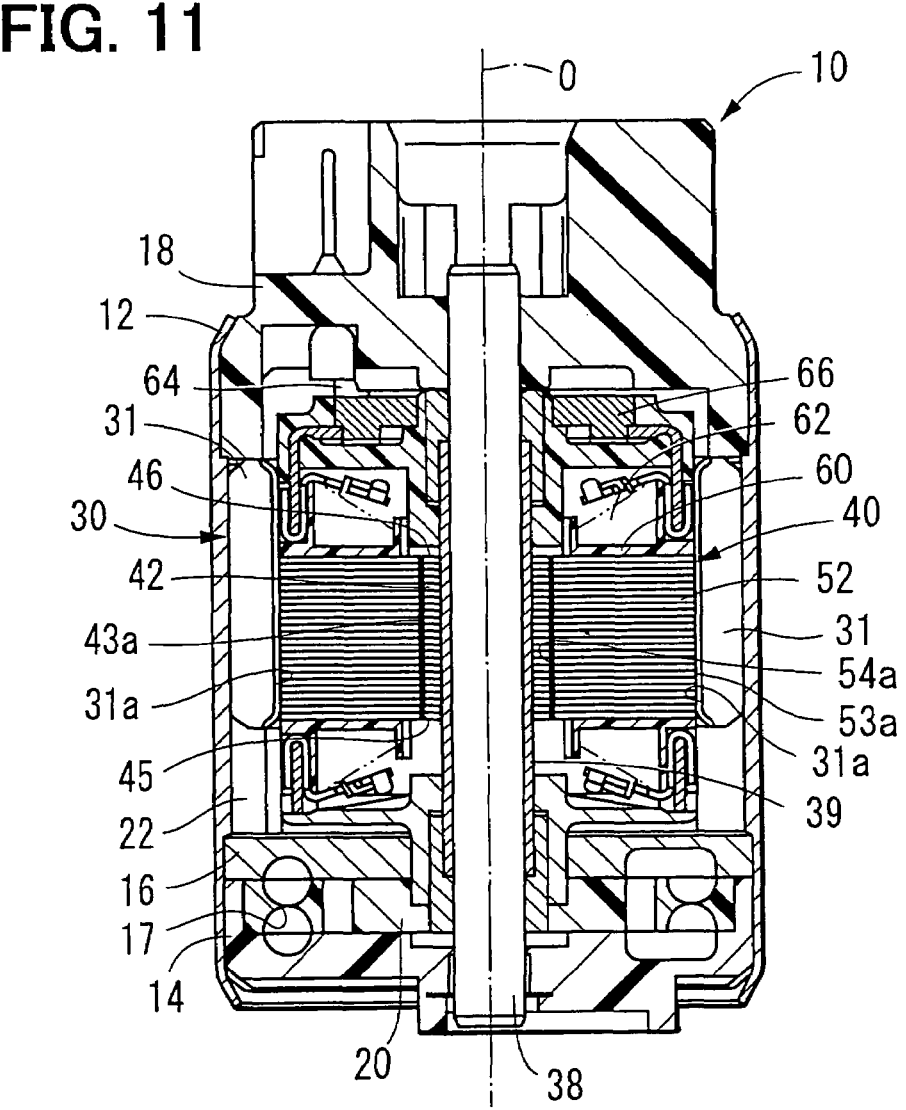
FIG. 11 is a cross-sectional side view of another fuel pump including the motor according to the preferred embodiment of the invention.

The shaft 38 can be 14 fixed to the fuel-inlet cover 14 and the fuel-outlet cover 18 instead of the center core 42, as shown in FIG. 11. In this case, the rotor 40 is disposed around the shaft 38 via a pipe 39 to rotate relative to the shaft 38. In FIG. 11, the same reference numeral indicates the same or substantially the same part or component as the previously described embodiment.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A method of manufacturing a motor including a permanent magnet unit disposed at a circumference for providing a plurality of magnetic poles, a rotor disposed inside the circumference so as to be coaxial with the permanent magnet unit, said rotor including a center core disposed coaxially with the center axis of the rotor, a plurality of coil cores disposed at peripheral portions of the rotor, and a plurality of concentrated coils respectively mounted on the coil cores, said method comprising:

punching corners of one end of the center core to form axially chamfered corners;

holding all of said plurality of coil cores at one time by peripheral portions thereof so that outer peripheries of the held coil cores are on a prescribed circle, thereby defining an inner periphery; and moving the center core in the axial direction thereof to insert the same into the inner periphery of the held coil cores from the end of the center core where the chamfered corners are formed so that the center core can be completely fitted to the held coil cores.

2. The method of manufacturing as claimed in claim 1, wherein said holding further comprises restricting the coil cores from moving in radially outward directions.

3. The method of manufacturing as claimed in claim 2, said restricting comprises radially pressing said coil cores in radially inward directions.

4. The method of claim 3, wherein said radially pressing comprises radially pressing with as many plungers as coil cores.

5. The method of manufacturing as claimed in claim 1, wherein said holding comprises restricting the coil cores to move in an axial direction of the prescribed circle.

* * * * *